(12) United States Patent  
Edwards

(10) Patent No.: US 8,816,964 B2  
(45) Date of Patent: Aug. 26, 2014

(54) SENSOR-AUGMENTED, GESTURE-ENABLED KEYBOARD AND ASSOCIATED APPARATUS AND COMPUTER-READABLE STORAGE MEDIUM

(75) Inventor: Cliff Edwards, Delta (CA)

(73) Assignee: McKesson Financial Holdings, Hamilton (BM)

( * ) Notice: Subject to any disclaimer, the term of this patent is extended or adjusted under 35 U.S.C. 154(b) by 103 days.

(21) Appl. No.: 13/009,478

(22) Filed: Jan. 19, 2011

(65) Prior Publication Data

US 2012/0133587 A1     May 31, 2012

Related U.S. Application Data

(60) Provisional application No. 61/417,361, filed on Nov. 26, 2010.

(51) Int. Cl.  
*G06F 3/02*           (2006.01)

(52) U.S. Cl.  
USPC .......................................................... 345/168

(58) Field of Classification Search  
CPC ...................................................... G06F 3/021  
USPC ................................................. 345/173, 168  
See application file for complete search history.

(56) References Cited

U.S. PATENT DOCUMENTS

| | | |
|---|---|---|
| 5,231,380 A | 7/1993 | Logan |
| 5,463,388 A | 10/1995 | Boie et al. |
| 5,543,588 A | 8/1996 | Bissett et al. |
| 5,675,361 A | 10/1997 | Santilli |
| 6,025,726 A | 2/2000 | Gershenfeld et al. |
| 6,204,839 B1 | 3/2001 | Mato, Jr. |
| 6,677,929 B2 | 1/2004 | Gordon et al. |
| 7,123,241 B2 | 10/2006 | Bathiche |
| 7,151,528 B2 | 12/2006 | Taylor et al. |
| 7,193,613 B2 | 3/2007 | Jam |
| 8,432,301 B2 * | 4/2013 | Edwards ......................... 341/34 |
| 2005/0122313 A1 | 6/2005 | Ashby |

(Continued)

OTHER PUBLICATIONS

Sensitronics LLC; Force Sensing Resistor (2 pgs.) http://www.sensitronics.com/products/force_sensing_resistor.htm site visited May 11, 2010.

(Continued)

*Primary Examiner* — Quan-Zhen Wang  
*Assistant Examiner* — Tony Davis  
(74) *Attorney, Agent, or Firm* — Alston & Bird LLP

(57) ABSTRACT

A keyboard is provided that includes an arrangement of keys, circuitry and a first processor configured to generate a signal in response to a keystroke in which a respective key of the arrangement of keys is depressed, and determine how to interpret the keystroke. The keyboard also includes one or more sensors and a second processor configured to measure a relationship of an object to the sensor(s), and produce a gesture signal based upon a signal representative of the measured relationship. This gesture signal is interpretable into one or more commands or instructions for directing performance of one or more operations of an apparatus or software operating on the apparatus. A related apparatus and computer-readable storage medium are also provided.

11 Claims, 5 Drawing Sheets

(56) References Cited

U.S. PATENT DOCUMENTS

| | | |
|---|---|---|
| 2006/0232557 A1 | 10/2006 | Fallot-Burghardt |
| 2007/0070052 A1 | 3/2007 | Westerman et al. |
| 2008/0111710 A1 | 5/2008 | Boillot |
| 2009/0174462 A1* | 7/2009 | Bronstein et al. ............. 327/517 |
| 2009/0251422 A1 | 10/2009 | Wu et al. |
| 2009/0295737 A1 | 12/2009 | Goldsmith et al. |
| 2010/0156814 A1* | 6/2010 | Weber et al. .................. 345/173 |
| 2010/0302153 A1 | 12/2010 | Jung et al. |
| 2011/0241997 A1* | 10/2011 | Yang ............................. 345/168 |
| 2012/0038496 A1* | 2/2012 | Edwards ........................ 341/34 |

OTHER PUBLICATIONS

Interlink Electronics; Standard Sensors; Standard FSR Solutions (1 pg.) http://www.interlinkelectronics.com/force_sensors/products/forcesensingresistors/standardsensors.html site visited May 11, 2010.

Paratech Limited; QTC Technology; Pressure-sensing and Switching http://peratech.com/qtctechnology.php site visited May 11, 2010.

Lion Precision Tech Note; Capacitive Sensor Operation and Optimization; LT03-0020; Feb. 2009 (5 pgs.).

Capacitive Proximity Sensors Theory of Operation 3 pgs, May 2010.

* cited by examiner

SENSOR-AUGMENTED, GESTURE-ENABLED KEYBOARD AND ASSOCIATED APPARATUS AND COMPUTER-READABLE STORAGE MEDIUM

CROSS-REFERENCE TO RELATED APPLICATIONS

The present application claims priority to U.S. Provisional Patent Application No. 61/417,361, entitled: Sensor-Augmented, Gesture-Enabled Keyboard and Associated Apparatus and Computer-Readable Storage Medium, filed on Nov. 26, 2010, the content of which is hereby incorporated by reference in its entirety.

FIELD OF THE INVENTION

The present invention generally relates to a user interface and methods for interacting with a computer system, and more particularly, to a gesture-enabled keyboard and associated apparatus and computer-readable storage medium.

BACKGROUND OF THE INVENTION

In the field of medical imaging, prior to the digitization of medical imaging, medical-imaging users (e.g., Radiologists) would analyze physical film printed images in light boxes, and use physical devices such as magnifying glasses, rulers, grease pencils, and their hands to manipulate the physical printed medical images in order to interpret and diagnose the images. With the digitization of medical imaging, the physical film became a digital image, displayable on a computer monitor. A medical-imaging system became a computer application or collection of computer applications, which require a computer or computers to operate. At present, medical-imaging systems are interacted with through a mouse and keyboard. Commands to the medical-imaging system are typically invoked through mouse and/or keyboard interactions.

For image-intensive computing with rich graphical user interfaces, the mouse is showing its age. The mouse constrains the interaction to a single x, y point on the display with buttons to make selections and initiate modes of operation, such as click and drag. Most modern computer mice also have a special purpose scroll mechanism, often a wheel. Much of the human hand and finger capabilities and dexterity are not utilized with a mouse, and a mouse is limited to only one hand. Using the mouse for long periods of time tends to cause fatigue and repetitive stress symptoms due to the need to grasp the device and repeatedly perform small stressing motions of the fingers to position, click and scroll.

For alphanumeric text entry, and initiating commands, keyboards have remained much the same for many decades and it has been difficult to find alternatives that perform better at text entry, for most users. When used as an input device for medical-imaging systems, some form of keyboard may remain in use for text entry for a long time to come.

Another common purpose for which keyboards are used with medical-imaging systems is for shortcut commands to activate discrete operations also available with the mouse but at the cost of pointer navigation time and additional mouse clicking. Most medical imaging professionals who commonly use picture archiving and communication system (PACS) workstations learn a number of these keyboard shortcuts to perform their work faster, and are willing to spend the effort to remember what keys map to what commands. For some interactive operations, shortcuts may also involve mouse modes of operation, often in conjunction with the keyboard. For example, a medical-imaging system zoom-image function could be mapped to the combination of holding down the Ctrl key and moving the mouse forward and back or rolling the scroll wheel. These common interactive operations that involve the mouse are ones that often take the most time to execute and cause the majority of repetitive strain injury (RSI) and fatigue issues.

SUMMARY OF THE INVENTION

The continued presence and usage of a physical keyboard with PACS workstations mean it can be used as a base for augmentation with additional sensors to enable fast interactive operations and without causing any additional clutter or hardware complexity for users. The user can maintain their hand position at the keyboard for longer periods, use the mouse less and perform common interactive operations quickly with low stress and fatigue. Exemplary embodiments of the present invention therefore provide an improved apparatus for more intuitively and efficiently interacting with a computer system, such as a medical-imaging system. According to one aspect of exemplary embodiments of the present invention, a keyboard is provided that includes a case, an arrangement of keys, circuitry and a first processor. The keys are affixed to or extend from the case, and the circuitry is located within the case. The circuitry forms a grid of circuits underneath respective keys of the arrangement of keys. In this regard, a circuit of the grid of circuits is configured to generate a signal in response to a keystroke in which a respective key of the arrangement of keys is depressed. The processor, then, is configured to receive the signal from the circuit of the grid of circuits, and compare a location of the respective circuit to a character map to determine how to interpret the keystroke.

The keyboard of this aspect further includes one or more sensors and a second processor. The sensor(s) are disposed proximate the case, and each sensor is associated with an operation of an apparatus or software operating on the apparatus. Each sensor is also configured to measure a relationship of an object (e.g., finger of a hand of a user) to the respective sensor, and produce a signal representative of the measured relationship. More particularly, for example, the second processor may be configured to determine a position and/or movement of the object relative to the respective sensor based on the respective signal, and produce a gesture signal representative of the determined at least one of position or movement. The second processor, then, is configured to receive a signal representative of a measured relationship of an object to a sensor of the sensor(s), and produce a gesture signal based upon the respective signal. This gesture signal is interpretable into one or more commands or instructions for directing performance of the operation associated with the respective sensor.

The sensor(s) may include, for example, force sensitive resistor sensor(s) at least some of which overlay the case. In this example, each force sensitive resistor sensor may be configured to detect contact of an object with the sensor and measure a pressure or force applied by the object to the respective sensor. The second processor, then, may be configured to receive a signal representative of a measured pressure or force applied to a sensor of the one or more sensors.

Additionally or alternatively, for example, the sensor(s) may include capacitive proximity sensor(s) at least some of which overlay or lie underneath the case or keys of the arrangement of keys, or are integrated within keys of the arrangement of keys. In this example, each capacitive proximity sensor may be configured to measure the proximity of an object to the respective proximity sensor, and the second processor may be configured to receive a signal representative of a measured proximity of an object to a sensor of the one or more sensors.

Further, for example, the sensor(s) may include trigger sensor(s). In this instance, the second processor may be configured to receive signals representative of measured relationships of an object to a trigger sensor and another sensor of the one or more sensors. The second processor may then be configured to produce a trigger signal based upon the signal representative of the measured relationship of the object to the trigger sensor, and produce the gesture signal based upon the signal representative of the measured relationship of the object to the other sensor. This trigger signal may be interpretable to enable interpretation of the gesture signal, which is otherwise ignored.

According to another aspect of exemplary embodiments of the present invention, an apparatus is provided that includes a processor configured to at least perform or cause the apparatus to at least perform a number of operations. The operations include receiving a signal from a keyboard that, similar to the keyboard described above, includes an arrangement of keys, one or more sensors and a second processor. The signal received from the keyboard is representative of a measured relationship of an object to a sensor of the sensor(s) of the keyboard. The operations, then, also include determining one or more commands or instructions for directing performance of the operation associated with the respective sensor, where the command(s) or instruction(s) are determined as a function of the signal received from the keyboard. In this regard, the command(s) or instruction(s) may include command(s) or instruction(s) that effectuate a change in a graphical output presented by a display during operation of the software operating on the apparatus.

In one particular example, the keyboard may include one or more trigger sensors and one or more other sensors, and a signal may be received from the keyboard in at least a first instance and a second instance. The signal in the first instance may include a trigger signal produced by the second processor based upon a signal representative of measured relationship of the object to a trigger sensor of the one or more trigger sensors, and the signal in the second instance may include the gesture signal. In this example, the processor may be configured to further perform or cause the apparatus to further perform, in the first instance, identifying the signal received from the keyboard as a trigger signal to thereby turn on gesture recognition and interpretation. The determination of command(s) or instruction(s) may then occur in the second instance after interpretation of the trigger signal in the first instance, where the processor is otherwise configured to ignore the gesture signal.

According to other aspects of exemplary embodiments of the present invention, a computer-readable storage medium is provided. Exemplary embodiments of the present invention therefore provide a keyboard including sensors, as well as an apparatus and computer-readable storage medium for directing operation of an apparatus or software operating on the apparatus via keyboard including sensors. As indicated above, and explained below, exemplary embodiments of the present invention may solve problems identified by prior techniques and provide additional advantages.

BRIEF DESCRIPTION OF THE DRAWINGS

Figure 1:
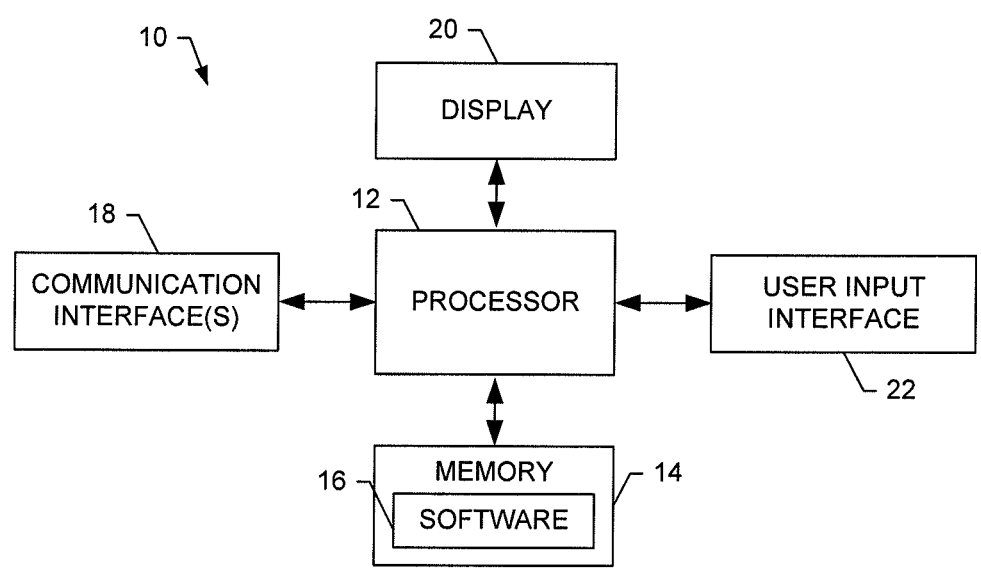
Figure 2:
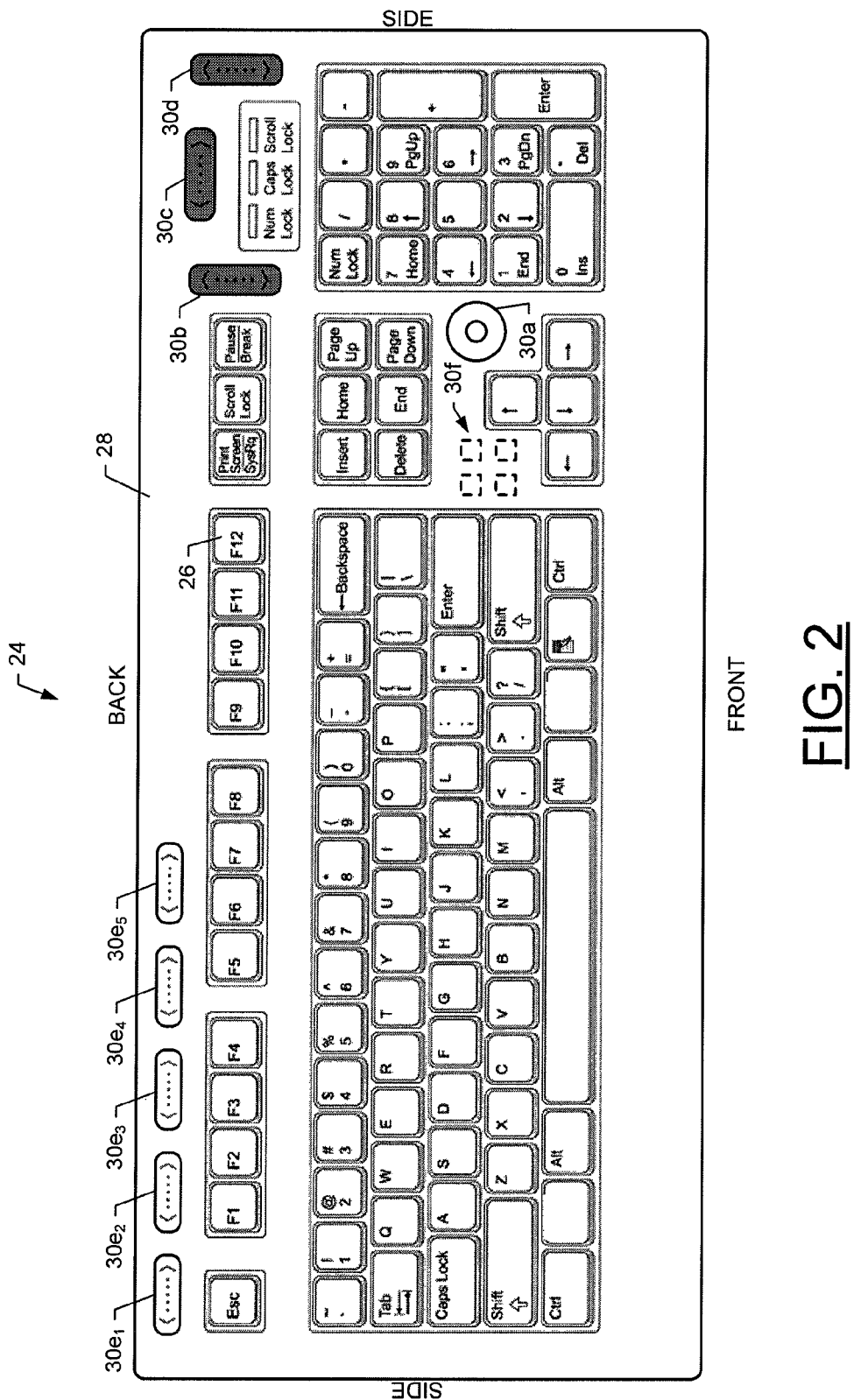
Figure 3:
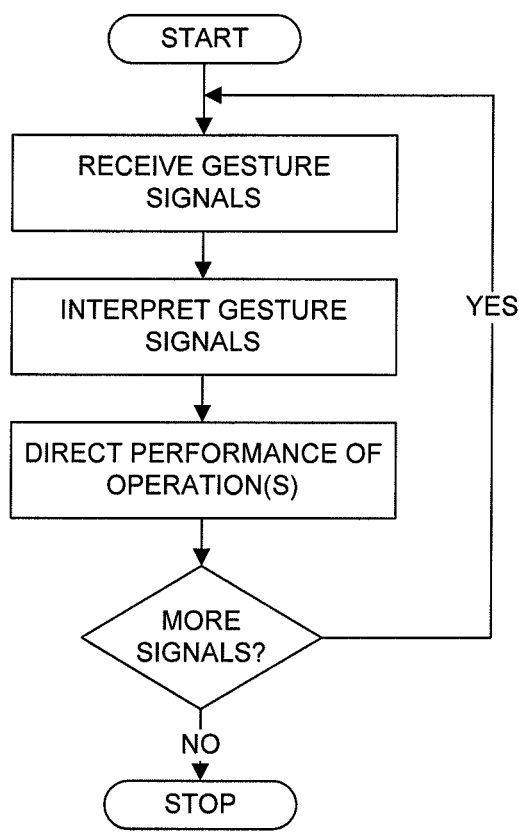

Having thus described the invention in general terms, reference will now be made to the accompanying drawings, which are not necessarily drawn to scale, and wherein:

FIG. 1 is a schematic block diagram of an apparatus configured to operate in accordance with embodiments of the present invention;

FIG. 2 is a schematic top view of a sensor augmented, gesture-enabled keyboard, according to exemplary embodiments of the present invention;

FIG. 3 is a flowchart illustrating various steps in a method of receiving and interpreting gesture signals into gesture commands or other instructions, according to exemplary embodiments of the present invention; and FIGS. 4-7 are schematic views of various example gesture movements that may be employed according to exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, references may be made herein to directions and orientations including vertical, horizontal, diagonal, right, left, front, back and side; it should be understood, however, that any direction and orientation references are simply examples and that any particular direction or orientation may depend on the particular object, and/or the orientation of the particular object, with which the direction or orientation reference is made. Like numbers refer to like elements throughout.

Referring to FIG. 1, a block diagram of one type of apparatus configured according to exemplary embodiments of the present invention is provided ("exemplary" as used herein referring to "serving as an example, instance or illustration"). The apparatus and method of exemplary embodiments of the present invention will be primarily described in conjunction with medical-imaging applications, such as in the context of a PACS workstation. It should be understood, however, that the method and apparatus of embodiments of the present invention can be utilized in conjunction with a variety of other applications, both in the medical industry and outside of the medical industry. Further, the apparatus of exemplary embodiments of the present invention includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention.

Generally, the apparatus of exemplary embodiments of the present invention may comprise, include or be embodied in one or more fixed electronic devices, such as one or more of a laptop computer, desktop computer, workstation computer, server computer or the like. In a more particular example, the apparatus may comprise, include or be embodied in a picture archiving and communication system (PACS) or other medical-imaging system workstation. Additionally or alternatively, the apparatus may comprise, include or be embodied in one or more portable electronic devices, such as one or more of a tablet computer, mobile telephone, portable digital assistant (PDA) or the like.

As shown in FIG. 1, the apparatus 10 of one exemplary embodiment of the present invention may include a processor 12 connected to a memory 14. The memory can comprise volatile and/or non-volatile memory, and typically stores content, data or the like. In this regard, the memory may store content transmitted from, and/or received by, the apparatus. The processor and/or memory may be embodied in any of a number of different manners including, for example, one or more of any of the following: microprocessors, processors with or without accompanying digital signal processor(s), special-purpose integrated circuits, field-programmable gate arrays (FPGAs), controllers, application-specific integrated circuits (ASICs), computers or the like.

The memory 14 may also store one or more software applications 16, instructions or the like for the processor to perform steps associated with operation of the entity in accordance with exemplary embodiments of the present invention (although any one or more of these steps may be implemented in hardware alone or in any combination with software and/or firmware). This software may include, for example, a gesture-interpretation engine configured to receive gesture signal(s) and interpret those signal(s) to direct performance of one or more functions of the apparatus. In addition, the software may include software applications (e.g., medical-imaging software, Internet browser, etc.), one or more operations of which may be directed by the gesture-interpretation engine (and, hence, the user of the apparatus via interaction with a sensor-augmented, gesture-enabled keyboard).

In addition to the memory 14, the processor 12 may also be connected to at least one interface or other means for displaying, transmitting and/or receiving data, content or the like. In this regard, the interface(s) may include at least one communication interface 18 or other means for transmitting and/or receiving data, content or the like, such as to and/or from other device(s) and/or network(s) coupled to the apparatus. In addition to the communication interface(s), the interface(s) may also include at least one user interface that may include one or more wireline and/or wireless (e.g., Bluetooth) earphones and/or speakers, one or more displays 20, and/or a user input interface 22. The user input interface, in turn, may comprise any of a number of wireline and/or wireless devices allowing the entity to receive data from a user, such as a microphone, an image or video capture device, a keyboard or keypad, a joystick, or other input device.

As shown in FIG. 2, according to a more particular exemplary embodiment, the user input interface 22 may include a gesture-enabled keyboard 24. Similar to a conventional keyboard, the gesture-enabled keyboard includes an arrangement of buttons or keys 26 (key generally referring to a button or key) affixed to or otherwise extending from a case 28, which may house a processor (and memory) and circuitry configured to interpret keystrokes on the keyboard. The processor and memory may be embodied in any of a number of different manners, including any of those described above. The keys of the keyboard may be depressed by a user to produce letters, numbers of symbols for input into a software application operating on the apparatus, and/or that may be depressed to effectuate functions of the apparatus or a software application operating on the apparatus. Although described herein as a keyboard, the gesture-enabled keyboard of exemplary embodiments of the present invention may additionally or alternatively include a keypad or other similar arrangement of keys or buttons.

Generally, the circuitry of the gesture-enabled keyboard 24 forms a grid of circuits underneath the keys 26 to form a key matrix. The circuits are configured to generate signals in response to the user depressing keys of the keyboard. For example, the circuits may be broken underneath the keys such that, when a user depresses one or more keys, the circuit(s) underneath the respective key(s) is completed; thereby generating signal(s) (e.g., current(s)). The processor receives the signal(s) from the respective circuit(s), and compares the location(s) of the circuit(s) to a character map (lookup table) in its memory to determine how to interpret the keystroke(s). As will be appreciated, although the keyboard may include mechanical-type switches that operate as above, the keyboard may alternatively employ non-mechanical switching techniques based on resistive or capacitive techniques.

As also shown in FIG. 2, in accordance with exemplary embodiments of the present invention, the circuitry of the gesture-enabled keyboard 24 further includes one or more sensors 30 and associated circuitry. The associated circuitry may include a processor and/or memory, which may be embodied in any of a number of different manners, including any of those described above. An example of suitable sensors include force sensitive resistor (FSR) sensors a number of which are shown in FIG. 2 as sensors 30a, 30b, 30c, 30d, 30e (including sensors $30e_1$, $30e_2$, $30e_3$, $30e_4$ and $30e_5$). Another example of suitable sensors includes capacitive proximity sensors such as those implementing projected capacitance techniques, a number of which are also shown in FIG. 2 as sensors 30f. It should be understood, however, that other similar sensors may be employed. And suitable circuitry may include, for example, the GestIC® technology developed by IDENT Technology AG of Germany.

The sensors 30 may be situated in any of a number of different relationships relative to keys 26 of the keyboard 24. For example, the FSR sensors 30a, 30b, 30c, 30d, 30e may overlay and be affixed to the case 28 of the keyboard between the keys or otherwise on areas of the case where there are no keys. The proximity sensors 30f, for example, may overlay and be affixed to, or lie underneath, the case 28 and/or keys of the keyboard, or may be integrated within the keys. Additionally, one or more sensors may overlay and be affixed to or lie underneath outer edges and/or a rest pad of the keyboard.

The sensors 30 may comprise any of a number of different types of known sensors configured to measure one or more values representative of an object contacting or otherwise coming into contact with the sensors, and produce corresponding signals as a function of the measured values. For example, the FSR sensors 30a, 30b, 30c, 30d, 30e may be configured to measure or otherwise detect contact of an object with the respective sensors, and may also be configured to measure a force or pressure applied by the object to the respective sensors. The proximity sensors 30f, for example, may be configured to measure proximity of an object to the respective sensors and produce corresponding signals as a function of the measured proximity.

The sensors 30 may further have a number of different sizes and shapes, and be arranged in any of a number of different manners. For example, the sensors may be shaped as a ring (e.g., sensor 30a), strips of different lengths (e.g., sensors 30b, 30c, 30d, 30e), a circular pad, a square or rectangular pad or the like. The sensors may be arranged individually or may be arranged in groups (e.g., sensors 30f) to enable collective coverage of a larger footprint of the keyboard 24. In one example embodiment, the proximity sensors (e.g., sensors 30f) may include a grid of sensors underneath the case 28 of the keyboard 24 and configured such that their electric fields (e-fields or sensing fields) are directed through the case and upward from a top surface the keyboard. For more information on suitable sensors and their placement with respect to the keyboard, see U.S. patent application Ser. No. 12/853,958, entitled: Gesture-Enabled Keyboard and Associated Apparatus and Computer-Readable Storage Medium, filed Aug. 10, 2010, the content of which is hereby incorporated by reference in its entirety.

As indicated above, the sensors 30 of the gesture-enabled keyboard 24 are configured to detect an object such as a user's hand proximate to or in contact with the respective sensors, and produce signals representative of the detected object's proximity to or contact with the respective sensors. In one more particular example, the signals may be representative of a force or pressure applied by the object to the respective sensors. The processor of the circuitry associated with the sensors may be configured to receive and process the signals to determine proximity/contact of the detected object with one or more of the sensors, and/or the position and/or movement of the detected object relative to the sensors (and hence, the keyboard). In addition, the processor may process the signals to further produce signal(s) representative of the determined proximity/contact, and/or position and/or movement, and possibly other related information such as velocity. These signal(s) (referred to herein as "gesture signals"), then, may be provided in addition to and independent of the interpretation of a keystroke determined by the processor of the keyboard.

In accordance with exemplary embodiments of the present invention, the gesture-enabled keyboard 24 may be configured to provide gesture signals and any keystroke interpretations to the device 10. Referring to FIG. 3, the gesture-interpretation engine (software 16) of the device may be configured to receive and interpret the respective gesture signals into gesture commands or other instructions for directing performance of one or more operations of the device, or more particularly in various instances, operations of other software operating on the device. At any instant in time, the sensors 30 and gesture-interpretation engine may be capable of detecting and interpreting gesture signals indicative of a single sensed point (single-sense) or multiple simultaneous sensed points (multi-sense). In various instances, execution of operations of the device may effectuate a change in a graphical output presented by the display 12 during operation of the other software.

The gesture-interpretation engine (software 16) may be configured to interpret the gesture signals and direct performance of one or more operations of the device 10 as a function of the respective signals. As explained below, various ones or combinations of ones of the sensors 30 may be associated with respective gesture movements to effectuate respective operations of the device. Thus, for example, each of a number of the FSR sensors, such as sensors 30a, 30b, 30c and 30d, may be associated with respective gesture movements that may be directly performed via user interaction with the respective sensors.

Others of the sensors, such as sensors $30e_1$, $30e_2$, $30e_3$, $30e_4$ and $30e_5$, may be designated as trigger sensors. Each of the trigger sensors or combinations of the trigger sensors may also be associated with respective gesture movements. But instead of the associated gesture movements being directly performed by the trigger sensors, the movements may instead be performed via user interaction with one or more of the proximity sensors 30f. The user may therefore contact a trigger sensor and perform its associated gesture movement with respect to the proximity sensors. The gesture-interpretation engine therefore may be configured to distinguish between movements of the user with respect to the proximity sensors intended as gesture movements and other movements not intended as gesture movements, such as those made during interaction with keys 26 of the keyboard 24.

More particularly, when the user contacts a trigger sensor or combination of trigger sensors (e.g., $30e_1$, $30e_2$, $30e_3$, $30e_4$, $30e_5$), the respective sensor(s) may produce appropriate signals processed by the processor of the sensor's associated circuitry into a trigger signal, which the device may identify as a trigger signal to turn on gesture recognition and interpretation of the associated gesture movement with respect to the proximity sensors. The trigger sensors (e.g., sensors $30e_1$, $30e_2$, $30e_3$, $30e_4$ and $30e_5$) may therefore function as a trigger mechanism to "turn on" gesture recognition and interpretation of movements detected by the proximity sensors—the device otherwise ignoring gesture signals from the proximity sensors. The device may respond to the user contacting the trigger sensors before or concurrent with gesture movements relative to the proximity sensors. The device and/or keyboard in these instances or more generally may provide feedback, such as aural and/or visual feedback (e.g., on the display 20 and/or by a visual indicator such as a light-emitting diode (LED) or the like), indicating that the keyboard is ready to receive—or is receiving—a gesture movement.

In addition to or in lieu of FSR sensors (e.g., sensors $30e_1$, $30e_2$, $30e_3$, $30e_4$ and $30e_5$) functioning as trigger sensors, one or more proximity sensors may function as trigger sensors that may be configured to detect trigger gesture movements to "turn on" gesture recognition and interpretation of movements detected by other proximity sensors. In one example, these proximity sensors may lie underneath the case 28 in the position of the trigger FSR sensors, and the keyboard may omit the respective FSR sensors. In this example, the proximity sensors or combinations of the proximity as trigger sensors may be associated with respective gesture movements. Then, when an object comes into proximity of a trigger proximity sensor or combination of trigger proximity sensors, the respective sensor(s) may cause the processor of the sensor's associated circuitry to produce a trigger signal, such as in a manner similar to that described above with respect to the FSR sensors as trigger sensors. Examples of other trigger mechanisms that may be performed utilizing proximity sensors are described in the aforementioned '958 application.

The gesture-interpretation engine (software 16) of the device 10 may be configured to process (interpret and direct device operations as a function of) the gesture signals as the engine receives the respective information. Alternatively, however, the engine may be configured to store the information for later processing or analysis by the engine, device or other software of the device. Additionally or alternatively, the device may be configured to transmit the information over a network to one or more other devices, where the information may undergo processing and/or analysis.

The gesture-interpretation engine may be configured to process the gesture signals and any other of the information in any of a number of different manners. As indicated above, for example, the engine may be configured to process the gesture signals to identify one or more gesture movements of the user and direct performance of one or more operations of the device 10, or more particularly in various instances, operations of other software operating on the device, as a function of the respective gesture movement(s). In this regard, the device may store a mapping between a distinct set of gestures movements and respective functions of the apparatus 10 or software application. That is, the gesture-interpretation engine may detect one or more gesture movements as inputs, and in response thereto, direct respective operations of the apparatus or software application as outputs. The gesture movements may be implemented in any appropriate sequence, or in various instances, multiple gesture movements may be implemented simultaneously. In the context of a PACS workstation, for example, gesture movements may be associated with imaging operations such as pan within an image or other display, zoom within an image or other display, rotate an image or other display, scroll through a series of images/displays, adjust an image/display window and level or the like. Gesture movements that may be simultaneously-implementable include those for functions such as simultaneous zoom and scroll, zoom and pan, scroll and adjust window and level or the like.

More particular examples of various gesture movements with respect to various FSR sensors 30a, 30b, 30c and 30d are provided below with reference to FIGS. 4-7. It should be understood, however, that the example gesture movements may be equally performed with respect to the proximity sensors 30f, such as in conjunction with the triggering sensors 30e. Other examples of gesture movements performed using the proximity sensors and other suitable trigger mechanisms are described in the aforementioned '958 application.

Figure 4:
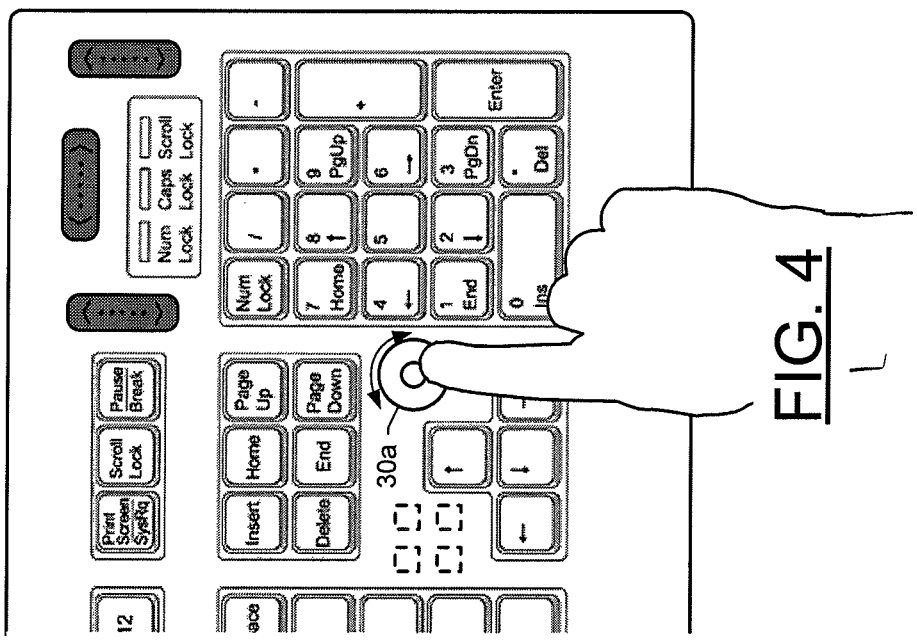

Referring to FIG. 4, FSR sensor 30a may be associated with, and may therefore be employed to direct performance of, scrolling operations within software operating on the device 10 (scrolling through a series of images/displays of the software). For example, to effectuate the scrolling operation, the user may place their finger in contact with the ring sensor, and then drag or slide their finger around the ring in one direction or the other. Movement of the user's finger in one direction may direct scrolling through a series in one direction, and movement of the user's finger in the other direction may direct scrolling through the series in the other direction.

Figure 5:
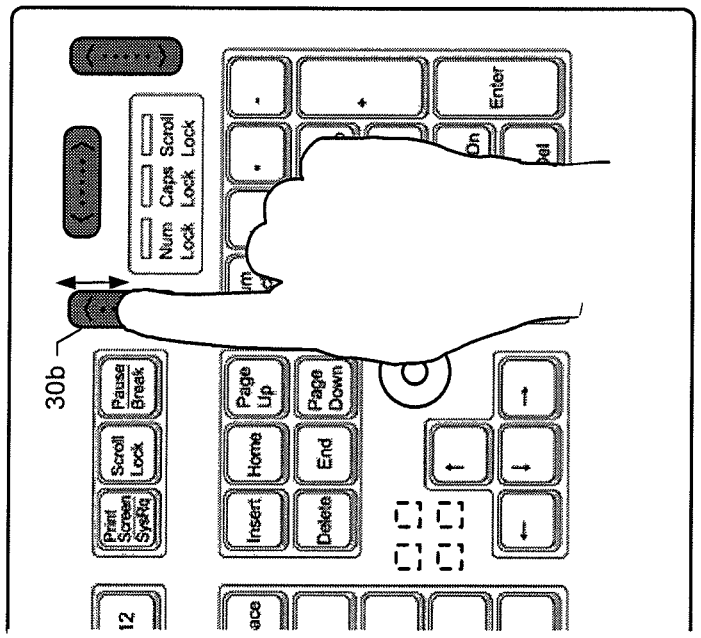
Figure 6:
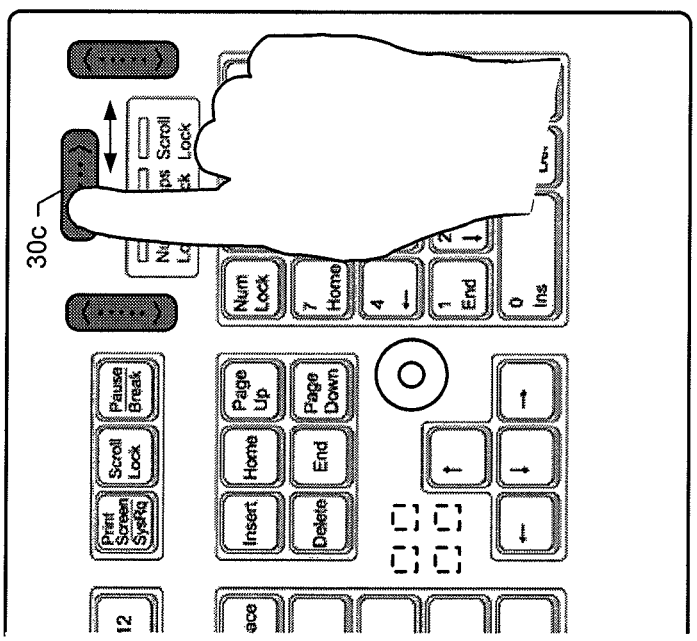

As shown in FIGS. 5 and 6, FSR sensors 30b and 30c may be associated with, and may therefore be employed to direct performance of, window/level adjustment operations within software operating on the device 10 (adjusting an image/display window and level). For example, to effectuate a window/level adjustment, the user may place their finger in contact with a respective one of the strip sensors and then drag or slide their finger up-and-down or side-to-side along the sensor. Movement of the user's finger in one direction along sensor 30b may, for example, direct adjustment of the level of an image/display in one direction, and movement of the user's finger in the other direction may direct adjustment of the level in the other direction. Similarly, movement of the user's finger in one direction along sensor 30c may, for example, direct adjustment of the window of an image/display in one direction, and movement of the user's finger in the other direction may direct adjustment of the window in the other direction.

Figure 7:
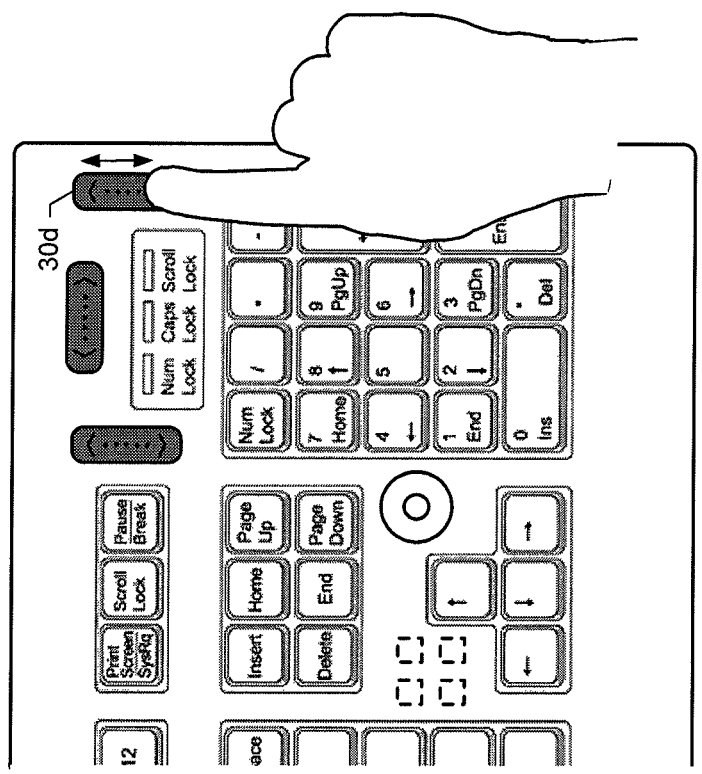

As shown in FIG. 7, FSR sensor 30d may be associated with, and may therefore be employed to direct performance of, zooming operations within software operating on the device 10. For example, to effectuate a zooming operation, the user may place their finger in contact with the respective strip sensor and then drag or slide their finger up-and-down along the sensor. Movement of the user's finger in one direction along the sensor may, for example, direct zooming in one direction (e.g., in/out), and movement of the user's finger in the other direction may direct zooming in the other direction (e.g., out/in).

As explained herein, the device 10 and the gesture-enabled keyboard 24 may each include a processor (e.g., processor 12) and/or circuitry (which may include a processor) configured to perform one or more functions. It should be understood that one or more of the functions of the processor of the device may instead be performed by the processor and/or circuitry of the gesture-enabled keyboard. Likewise, one or more of the functions of the processor and/or circuitry of the gesture-enabled keyboard may instead be performed by the processor of the device. And even further, one or more of the functions of the processor and/or circuitry of either or both of the device or gesture-enabled keyboard may be performed by yet another device, which may be directly or indirectly coupled to the device or gesture-enabled keyboard, such as via one or more network(s).

According to one aspect of the present invention, all or a portion of an apparatus (e.g., device 10, gesture-enabled keyboard 24) generally operates under control of a computer program. The computer program for performing the methods of exemplary embodiments of the present invention may include one or more computer-readable program code portions, such as a series of computer instructions, embodied or otherwise stored in a non-transitory computer-readable storage medium, such as the non-volatile storage medium.

It will be understood that each step of a method according to exemplary embodiments of the present invention, and combinations of steps in the method, may be implemented by computer program instructions. These computer program instructions may be loaded onto a computer or other programmable apparatus to produce a machine, such that the instructions which execute on the computer or other programmable apparatus create means for implementing the functions specified in the step(s) of the method. These computer program instructions may also be stored in a computer-readable memory that can direct a computer or other programmable apparatus to function in a particular manner, such that the instructions stored in the computer-readable memory produce an article of manufacture including instruction means which implement steps of the method. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing steps of the method.

Accordingly, exemplary embodiments of the present invention support combinations of means for performing the specified functions, combinations of steps for performing the specified functions and program instruction means for performing the specified functions. It will also be understood that each step or function, and combinations of steps or functions, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. It should therefore be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A keyboard comprising:
   a case;
   an arrangement of keys affixed to or extending from the case;
   circuitry located within the case and forming a grid of circuits underneath respective keys of the arrangement of keys, a circuit of the grid of circuits being configured to generate a signal in response to a keystroke in which a respective key of the arrangement of keys is depressed;

a first processor configured to receive the signal from the circuit of the grid of circuits, and compare a location of the respective circuit to a character map to determine how to interpret the keystroke;

one or more force sensitive resistors disposed proximate the case, each force sensitive resistor being associated with an operation of an apparatus or software operating on the apparatus, each force sensitive resistor being configured to measure a relationship of an object to the respective force sensitive resistor, and produce a signal representative of the measured relationship;

a second processor configured to receive a signal representative of the measured relationship of the object to a force sensitive resistor of the one or more force sensitive resistors, and produce a gesture signal based upon the respective signal, the gesture signal being interpretable into one or more commands or instructions for directing performance of the operation associated with the respective force sensitive resistor;

one or more additional sensors, the additional sensors comprising:
  one or more capacitive proximity sensors, at least some of which overlay or lie underneath the case or keys of the arrangement of keys, or are integrated within keys of the arrangement of keys, wherein each capacitive proximity sensor is configured to measure a proximity of an object to the respective proximity sensor, and wherein the second processor is further configured to receive a signal representative of the measured proximity of an object to one of the capacitive proximity sensors; and
  one or more trigger sensors, wherein the second processor being configured to receive a signal representative of a measured relationship includes being configured to receive signals representative of measured relationships of an object to a trigger sensor and another force sensitive resistor of the one or more force sensitive resistors, wherein the second processor is configured to produce a trigger signal based upon the signal representative of the measured relationship of the object to the trigger sensor, the trigger signal being interpretable to enable interpretation of the gesture signal, which is otherwise ignored.

2. The keyboard of claim 1, wherein the second processor being configured to produce a gesture signal based upon the respective signal includes being configured to determine at least one of a position or movement of the object relative to the respective force sensitive resistor based on the respective signal, and produce a gesture signal representative of the determined at least one of position or movement.

3. The keyboard of claim 1,
wherein the second processor being configured to receive a signal representative of a measured relationship of an object to a force sensitive resistor of the one or more force sensitive resistors comprises being configured to receive a signal representative of a measured pressure or force applied to a force sensitive resistor of the one or more force sensitive resistors.

4. An apparatus comprising a processor configured to at least perform or cause the apparatus to at least perform the following:
  receiving a signal from a keyboard, the keyboard comprising:
    an arrangement of keys;
    one or more force sensitive resistors each of which is associated with an operation of the apparatus or software operating on the apparatus, each force sensitive resistor being configured to measure a relationship of an object to the respective force sensitive resistor, and produce a signal representative of the measured relationship;
    one or more additional sensors comprising:
      one or more capacitive proximity sensors each of which is configured to measure a proximity of an object thereto; and
      one or more trigger sensors configured to cause the second processor to produce a trigger signal based upon a signal representative of the measured relationship of the object to a trigger sensor of the one or more trigger sensors;
    a second processor configured to:
      receive a first signal representative of the measured relationship of the object to a force sensitive resistor of the one or more force sensitive resistors, and produce a gesture signal based upon the first signal, the signal received from the keyboard including the gesture signal;
      receive a second signal representative of a measured proximity of the object to a capacitive proximity sensor of the one or more capacitive proximity sensors;
      determine a trigger signal based upon the measured relationship of the object to a trigger sensor of the one or more trigger sensors; and
      determine a gesture signal based at least in part on at least one of the first signal or the second signal, wherein the signal received from the keyboard comprises at least one of the gesture signal or the trigger signal; and
  determining one or more commands or instructions for directing performance of the operation associated with the respective force sensitive resistor, the one or more commands or instructions being determined as a function of the gesture signal received from the keyboard, wherein determining one or more commands or instructions occurs in response to receiving the trigger signal to turn on gesture recognition and interpretation from the keyboard, the processor otherwise being configured to ignore the gesture signal.

5. The apparatus of claim 4, wherein determining one or more commands or instructions includes determining one or more commands or instructions that effectuate a change in a graphical output presented by a display during operation of the software operating on the apparatus.

6. The apparatus of claim 4, wherein receiving a signal from a keyboard includes receiving a signal from a keyboard including a second processor configured to determine at least one of a position or movement of the object relative to the respective force sensitive resistor based on the respective signal, and produce a gesture signal representative of the determined at least one of position or movement.

7. The apparatus of claim 4, wherein receiving a signal from a keyboard includes receiving a signal from a keyboard including one or more force sensitive resistors each of which is configured to detect contact of an object therewith and measure a pressure or force applied by the object thereto, and wherein the second processor is further configured to receive a signal representative of a measured pressure or force applied to a force sensitive resistor of the one or more force sensitive resistors, and produce a gesture signal based upon the respective signal.

8. A non-transitory computer-readable storage medium having computer-readable program code portions stored therein, the computer-readable program code portions being configured to direct a processor to at least perform or cause an apparatus to at least perform the following:

receiving a signal from a keyboard, the keyboard comprising:

an arrangement of keys;

one or more force sensitive resistors each of which is associated with an operation of the apparatus or software operating on the apparatus, each force sensitive resistor being configured to measure a relationship of an object to the respective force sensitive resistor, and produce a signal representative of the measured relationship;

one or more additional sensors comprising:

one or more capacitive proximity sensors each of which is configured to measure a proximity of an object thereto; and one or more trigger sensors configured to cause the second processor to produce a trigger signal based upon a signal representative of a measured relationship of the object to a trigger sensor of the one or more trigger sensors;

a second processor configured to:

receive a first signal representative of the measured relationship of the object to a force sensitive resistor of the one or more force sensitive resistors, and produce a gesture signal based upon the first signal, the signal received from the keyboard including the gesture signal;

receive a second signal representative of a measured proximity of the object to a capacitive proximity sensor of the one or more capacitive proximity sensors;

determine a trigger signal based upon a measured relationship of the object to a trigger sensor of the one or more trigger sensors; and determine a gesture signal based at least in part on at least one of the first signal or the second signal, wherein the signal received from the keyboard comprises at least one of the gesture signal or the trigger signal; and determining one or more commands or instructions for directing performance of the operation associated with the respective force sensitive resistor, the one or more commands or instructions being determined as a function of the gesture signal received from the keyboard, wherein determining one or more commands or instructions occurs in response to receiving the trigger signal to turn on gesture recognition and interpretation from the keyboard, the processor otherwise being configured to ignore the gesture signal.

9. The computer-readable storage medium of claim 8, wherein determining one or more commands or instructions includes determining one or more commands or instructions that effectuate a change in a graphical output presented by a display during operation of the software operating on the apparatus.

10. The computer-readable storage medium of claim 8, wherein receiving a signal from a keyboard includes receiving a signal from a keyboard including a second processor configured to determine at least one of a position or movement of the object relative to the respective force sensitive resistor based on the respective signal, and produce a gesture signal representative of the determined at least one of position or movement.

11. The computer-readable storage medium of claim 8, wherein receiving a signal from a keyboard includes receiving a signal from a keyboard including the one or more force sensitive resistors each of which is configured to detect contact of an object therewith and measure a pressure or force applied by the object thereto, and including a second processor configured to receive a signal representative of a measured pressure or force applied to a force sensitive resistor of the one or more force sensitive resistor, and produce a gesture signal based upon the respective signal.

\* \* \* \* \*